US010029618B2

(12) United States Patent
Perez Astudillo et al.

(10) Patent No.: US 10,029,618 B2
(45) Date of Patent: Jul. 24, 2018

(54) REMOVABLE AND EXPANDABLE STORAGE UNIT FOR A MOTOR VEHICLE

(71) Applicant: FORD GLOBAL TECHNOLOGIES, LLC, Dearborn, MI (US)

(72) Inventors: Miriam Quilahztli Perez Astudillo, Cuautitlan Izcalli (MX); Eduardo Arturo Aguilar Ruelas, Mexico City (MX); Mario Daniel Bautista, Mexico City (MX); Hector Alberto Mendoza Saldivar, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/094,430

(22) Filed: Apr. 8, 2016

(65) Prior Publication Data
US 2017/0291554 A1 Oct. 12, 2017

(51) Int. Cl.
B60R 7/00 (2006.01)
B60R 5/04 (2006.01)
B60N 3/10 (2006.01)
B60R 7/02 (2006.01)

(52) U.S. Cl.
CPC .............. *B60R 5/048* (2013.01); *B60N 3/102* (2013.01); *B60R 5/04* (2013.01); *B60R 7/005* (2013.01); *B60R 7/02* (2013.01)

(58) Field of Classification Search
CPC ......... B60N 3/102; B60R 5/045; B60R 5/048; B60R 7/005
USPC .................................. 296/37.5, 37.16, 37.13
See application file for complete search history.

(56) References Cited

U.S. PATENT DOCUMENTS

| 2,069,345 | A | * | 2/1937 | Widman | B60R 5/042 220/666 |
| 3,088,771 | A | * | 5/1963 | Weigle | B60N 3/08 224/275 |
| 3,165,247 | A | * | 1/1965 | Burns | B60R 7/043 224/275 |
| 4,936,103 | A | | 6/1990 | Newman | |
| 5,795,005 | A | * | 8/1998 | Garfias | B60R 7/046 220/9.2 |
| 6,623,059 | B2 | * | 9/2003 | Gehring | B60R 7/02 220/4.28 |
| 6,623,060 | B2 | * | 9/2003 | Gehring | B60R 7/02 220/8 |
| 6,672,301 | B2 | | 1/2004 | Delzanno et al. | |
| 6,832,799 | B2 | * | 12/2004 | Haspel | B60R 5/04 224/539 |

(Continued)

FOREIGN PATENT DOCUMENTS

DE 2950766 A1 6/1981
DE 102005035273 A1 * 2/2007 ............. B60N 3/102

(Continued)

OTHER PUBLICATIONS

English Machine Translation of DE102012004821A1.

(Continued)

*Primary Examiner* — Dennis H Pedder
(74) *Attorney, Agent, or Firm* — Vichit Chea; King & Schickli, PLLC

(57) ABSTRACT

A storage unit is provided for a motor vehicle. That storage unit includes an expandable body and a connector that releasably secures the expandable body to a component of the motor vehicle.

6 Claims, 8 Drawing Sheets

(56) References Cited

U.S. PATENT DOCUMENTS

| | | | |
|---|---|---|---|
| 7,043,926 B2 | 5/2006 | Smith | |
| 7,121,601 B2 * | 10/2006 | Mulvihill | B60R 7/02 296/24.33 |
| 7,708,329 B2 * | 5/2010 | Duller | B60R 7/005 296/37.13 |
| 7,758,092 B2 * | 7/2010 | Kolpasky | B60R 5/045 296/24.43 |
| 7,762,601 B2 * | 7/2010 | Shea | B60H 1/00592 296/37.16 |
| 7,762,602 B2 * | 7/2010 | Bohlke | B60R 5/045 296/37.16 |
| 8,209,995 B2 * | 7/2012 | Kieling | A45C 3/001 62/457.1 |
| 8,714,617 B2 * | 5/2014 | Hipshier | B60R 7/04 296/24.34 |
| 8,757,695 B2 * | 6/2014 | Dinger | B60R 7/02 296/37.5 |
| 2003/0218347 A1 * | 11/2003 | Gehring | B60R 7/02 296/37.5 |
| 2008/0110950 A1 * | 5/2008 | Dowd | B60R 11/00 224/547 |
| 2009/0045645 A1 * | 2/2009 | Bohlke | B60R 7/02 296/37.5 |
| 2009/0066104 A1 * | 3/2009 | Duller | B60R 9/00 296/37.5 |
| 2009/0072567 A1 * | 3/2009 | Bohlke | B60R 5/045 296/37.5 |
| 2009/0218849 A1 | 9/2009 | Rupar | |
| 2009/0315358 A1 * | 12/2009 | Kolpasky | B60R 5/045 296/37.5 |
| 2010/0052353 A1 * | 3/2010 | Shea | B60H 1/00592 296/37.16 |
| 2013/0257081 A1 * | 10/2013 | Whalen | B60R 5/045 296/37.5 |
| 2013/0320694 A1 * | 12/2013 | Dinger | B60R 5/04 296/37.16 |
| 2016/0185300 A1 * | 6/2016 | Parlow | B60R 13/025 296/37.13 |

FOREIGN PATENT DOCUMENTS

| | | | | |
|---|---|---|---|---|
| DE | 102012004821 A1 | | 9/2013 | |
| DE | 202015005371 U1 | | 10/2015 | |
| FR | 2710595 A1 | * | 4/1995 | B60R 5/045 |
| GB | 1305189 A | * | 1/1973 | B60R 7/005 |
| JP | 2008087625 | * | 4/2008 | |
| KR | 20140084759 A | | 7/2014 | |
| WO | WO 2016036939 A1 | * | 3/2016 | B60R 5/04 |

OTHER PUBLICATIONS

English Machine Translation of DE202015005371U1.
English Machine Translation of KR20140084759A.
English Translation of DE2950766A1.

* cited by examiner

REMOVABLE AND EXPANDABLE STORAGE UNIT FOR A MOTOR VEHICLE

TECHNICAL FIELD

This document relates generally to the motor vehicle equipment field and, more particularly, to a removable and expandable storage unit that may be utilized to hold and transport various items including food items that may need to be maintained at a temperature above or below the environmental temperature during transport.

BACKGROUND

Motor vehicle operators often drive to stores to purchase food and beverages. Many times they buy a food or beverage item that needs to stay fresh/cold (e.g. vegetables, frozen food, ice cream) or warm (prepared food) during a commute back home. In some cases this need for item temperature maintenance forces the vehicle operator to return immediately home to avoid significant and undesired temperature changes in the food or beverages being transported.

While a vehicle operator may utilize an aftermarket cooler for such a purpose, it should be appreciated that an aftermarket cooler occupies a substantial amount of space in the motor vehicle and will often be removed from the vehicle when not needed. In such a situation, such a cooler is often not in the vehicle when the food or beverages are purchased and it is needed most. Alternatively, the operator might simply forget to put the cooler in the vehicle when going to the market. Further, it should be appreciated an aftermarket cooler is not typically secured in the motor vehicle and, therefore, is loose in the storage area and subject to movement during operation of the motor vehicle. In some situations the aftermarket cooler may flip over and the contents of the cooler may spill.

This document relates to a new and improved storage unit for a motor vehicle that may be expanded when needed and contracted so as to be completely out of the way when not required for use. Further, the storage unit is releasably secured to the motor vehicle and thus will not slide around or flip over thereby ensuring that the contents in the storage unit are maintained in the storage unit in effective thermal isolation so as to maintain a desired temperature for the item over an extended period of time.

SUMMARY

In accordance with the purposes and benefits described herein, a storage unit is provided for a motor vehicle. That storage unit comprises an expandable body and a connector releasably securing the expandable body to a component in the motor vehicle. That component may comprise a trim panel such as a trunk scuff panel in the storage area of the motor vehicle.

The storage unit may further include an optional handle on the expandable body. The connector may be carried on a first wall of the expandable body while the handle is carried on a second wall of the expandable body where the first wall is opposite the second wall. Further, the first and second walls may be made from a rigid material.

The expandable body may be displaceable between a stowed position wherein the expandable body is contracted so as to occupy a minimal amount of space and a deployed position wherein the expandable body is expanded in volume to hold a number of different items. In one possible embodiment, when the expandable body is contracted into the stowed position it is received and completely held in a cavity in the trim panel so as to be completely out of the way and virtually concealed from view.

In order to allow for expandability, the expandable body includes an accordion bottom wall and opposed accordion sidewalls that extend between the first and second walls. Further the expandable body may include a cover that is securable to the first wall, the second wall and the opposed sidewalls so as to completely enclose the expandable body opposite the bottom wall. Of course, the expandable body may be made from a thermal insulating or isolating material so as to better maintain items held therein at a desired temperature for a longer period of time.

As should be appreciated, the storage unit may also be removed from the motor vehicle. Toward this end, the connector for securing the expandable body to the trim panel may be selected from a group of structures consisting of cooperating hook and loop fasteners, a zipper or other appropriate means allowing easy connection and disconnection of the storage unit.

The storage unit may also include a lock mechanism to selectively secure the storage unit in the stowed position and the deployed position. That lock mechanism may include a snap fastener carried on the expandable body, a first anchor grommet in a trunk carpet of the motor vehicle at a first position and a second anchor grommet in the trunk carpet at a second position. The snap fastener may be engaged in the first anchor grommet to secure the expandable body in the stowed position and in the second anchor grommet to secure the expandable body in the deployed position.

In the following description, there are shown and described several preferred embodiments of the removable and expandable storage unit. As it should be realized, the storage unit is capable of other, different embodiments and its several details are capable of modification in various, obvious aspects all without departing from the storage unit as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the removable and expandable storage unit and together with the description serve to explain certain principles thereof. In the drawing figures.

Figure 1:
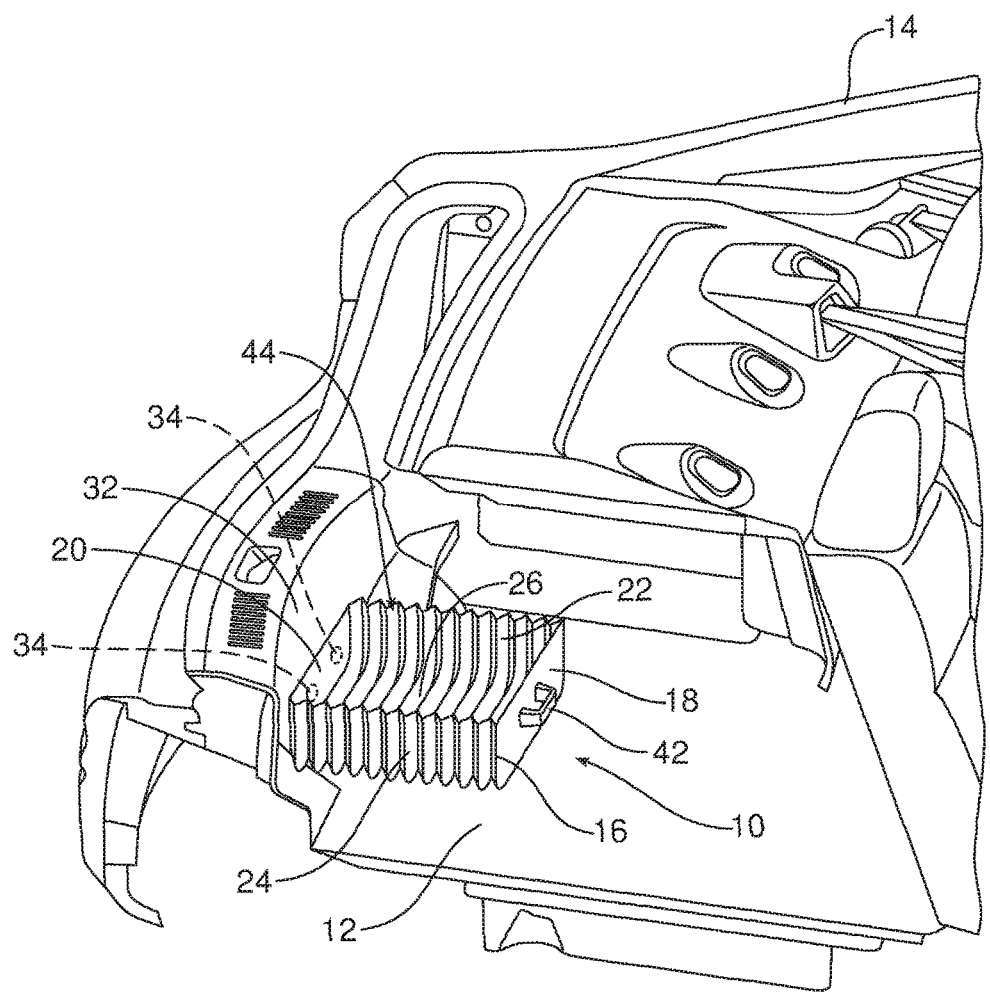
FIG. 1 is a perspective view of the storage unit attached to a trunk scuff panel in a trunk of the motor vehicle and with the expandable body in the deployed position and open for receiving items.

Reference will now be made in detail to the present preferred embodiments of the removable and expandable storage unit, examples of which are illustrated in the accompanying drawing figures.

DETAILED DESCRIPTION

Reference is now made to FIGS. 1-4 illustrating the storage unit 10 positioned in a trunk 12 of a motor vehicle 14. As illustrated, the storage unit 10 includes an expandable body 16 comprising a first end wall 18, a second end wall 20, opposite the first end wall, opposed sidewalls 22, 24, a bottom wall 26 and a removable cover 28. Preferably, the entire expandable body 16, including the end walls 18, 20, the opposed sidewalls 22, 24, the bottom wall 26 and removable cover 28 are made from a temperature insulating or isolating material specifically adapted to maintain the temperature of any items contained in the expandable body 16 for an extended period of time whether or not that temperature is above ambient temperature or below ambient temperature. Thus, it should be appreciated that the storage unit 10 is particularly useful for transporting hot or cold food and/or beverage items from a store to the home or other desired destination. The temperature insulating or isolating material may be of any appropriate type known in the art to be useful for such a purpose.

Figure 2:
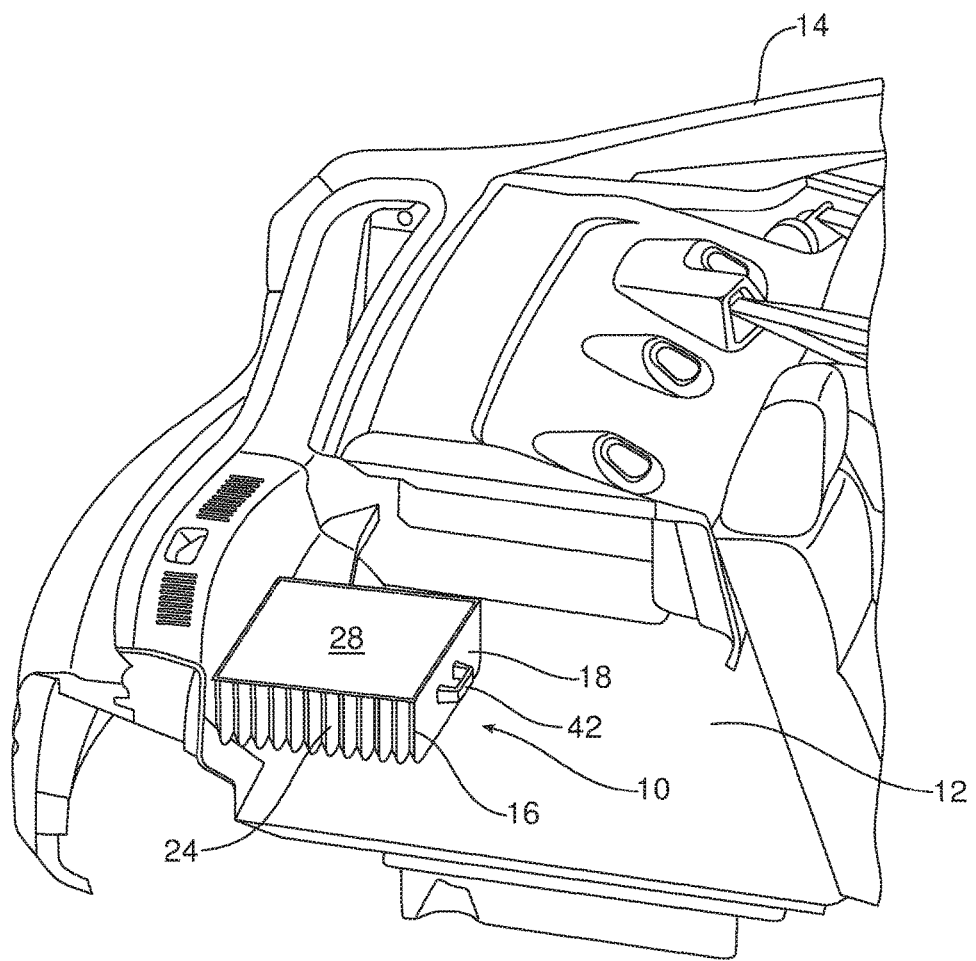
FIG. 2 is a view similar to FIG. 1 but showing the cover in place enclosing the storage compartment provided by the expandable body.
Figure 4:
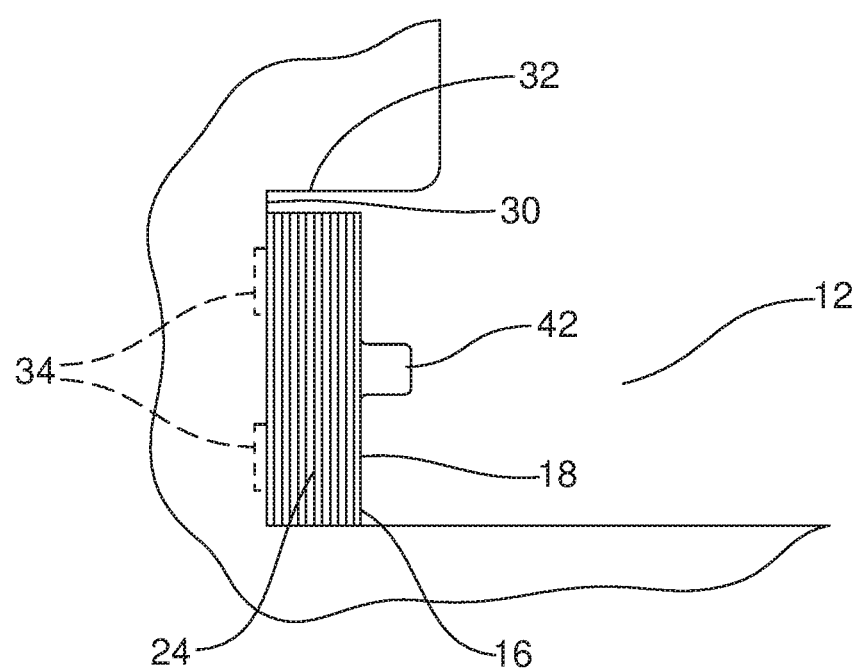
FIG. 4 is a schematic side elevational view illustrating the expandable body in the stowed position fully received within a cavity of the trunk scuff panel.

As should be further appreciated from reviewing the drawing figures, the first and second end walls 18, 20 may be reinforced to be substantially rigid while the opposed sidewalls 22, 24 and bottom wall 26 may incorporate an accordion construction in order to allow the storage unit to be displaced between the expanded or deployed position illustrated in FIGS. 1 and 2 and the fully contracted or stowed position illustrated in FIG. 4 wherein the storage unit 10 is fully received within a cavity 30 provided in the trim panel 32 to which the storage unit 10 is releasably connected.

Toward this end, an optional handle 42 may be secured to the first end wall 18. As should be appreciated from reviewing FIGS. 3 and 4, the handle 42 is, therefore, oriented outward from the trim panel 32 so as to be easily accessed to be engaged with the hand in order to expand or contract the body 16 as desired. In addition, a connector 34 is provided to connect the second end wall 20 of the expandable body 16 directly to the trim panel 32 or the vehicle body structure behind the trim panel. Thus, it should be appreciated that the handle 42 and connector 34 are provided on opposed end walls 18, 20.

In various embodiments, the connector 34 may comprise cooperating hook and loop fasteners, a zipper or other appropriate means allowing one to easily connect and disconnect the storage unit 10 from the trim panel 32 when one wishes to install or remove the storage unit 10 from the trunk 12 such as for cleaning.

In use, one opens the trunk, engages the handle 42 and displaces the expandable body 16 from the stowed position illustrated in FIG. 4 to the fully expanded or deployed position illustrated in FIG. 1. The user then loads any desired items such as ice cream and frozen food packages into the storage compartment 44 formed by the expandable body 16 so that the items are resting on the bottom wall 26 between the end walls 18, 20 and the opposed sidewalls. One then positions the removable cover 28 over the expandable body 16 so as to engage the end walls 18, 20 and the opposed sidewalls 22, 24 and fully close the storage unit 10. Here it should be appreciated that the removable cover 28 may be secured and fastened to the end walls 18, 20, and the opposed sidewalls 22, 24 in a manner that effectively seals the storage unit 10. Toward this end, the cover 28 may be secured to the end walls 18, 20 and opposed sidewalls 22, 24 by any appropriate means or fastener including, for example, cooperating hook and loop fasteners or a zipper that extends completely around the top of the expandable body 16. Since the entire expandable body 16 including the end walls 18, 20, the opposed sidewalls 22, 24, the bottom wall 26 and removable cover 28 are all made from a thermal insulating or isolating material, the items contained in the storage unit 10 are protected from a temperature change during transport in the motor vehicle 14.

After closing the trunk, the user may drive the motor vehicle 14 from the store to his home or other destination. During the drive, the items placed in the storage unit 10 are maintained in the sealed storage compartment 44 and the storage unit 10 is secured in position in the trunk 12 by the connector 34 between the second end wall 20 and the trim panel 32. Thus, the storage unit 10 is maintained in position and prevented from tipping over, rolling around and potentially spilling the contents in the storage compartment 44.

Figure 3:
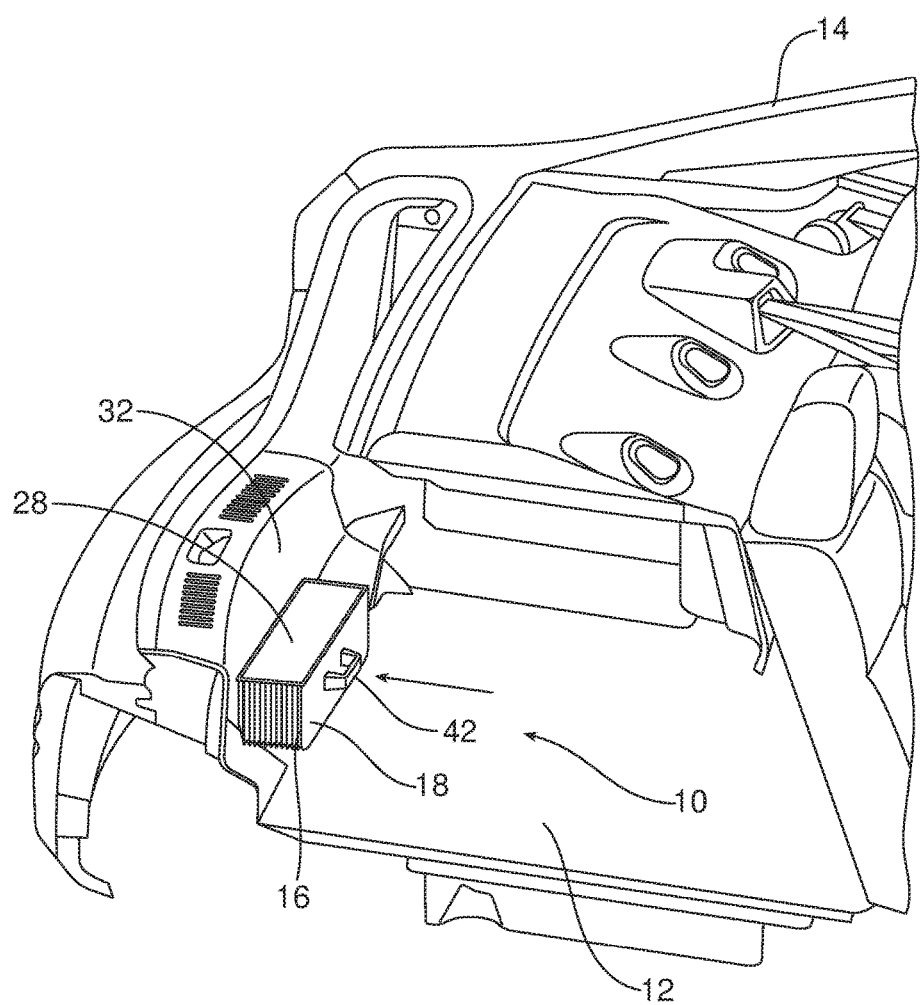
FIG. 3 is a view similar to FIGS. 1 and 2 but showing the expandable body being displaced from the deployed position to the contracted, stowed position.

Upon reaching the desired destination, the user again opens the trunk in order to access the storage unit 10. Next, the user opens the cover 28 and removes the contents or items from the storage compartment 44. The entire storage unit 10 may then be displaced and contracted into the stowed position as illustrated in FIGS. 3 and 4 if the user so desires. Here it should be appreciated that the accordion sidewalls 22, 24, accordion bottom wall 26 and flexible cover 28 are designed to readily assume the contracted or stowed position.

Figure 5:
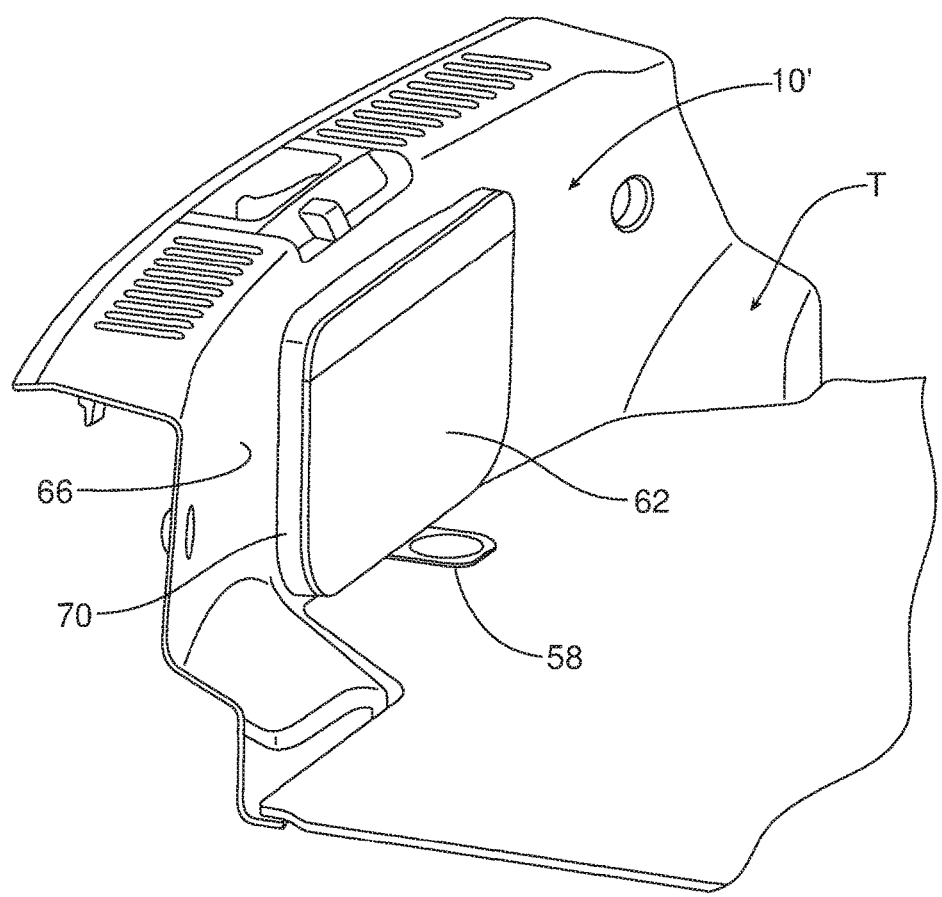
FIG. 5 is a perspective view of an alternative embodiment of storage unit in the stowed position.
Figure 5A:
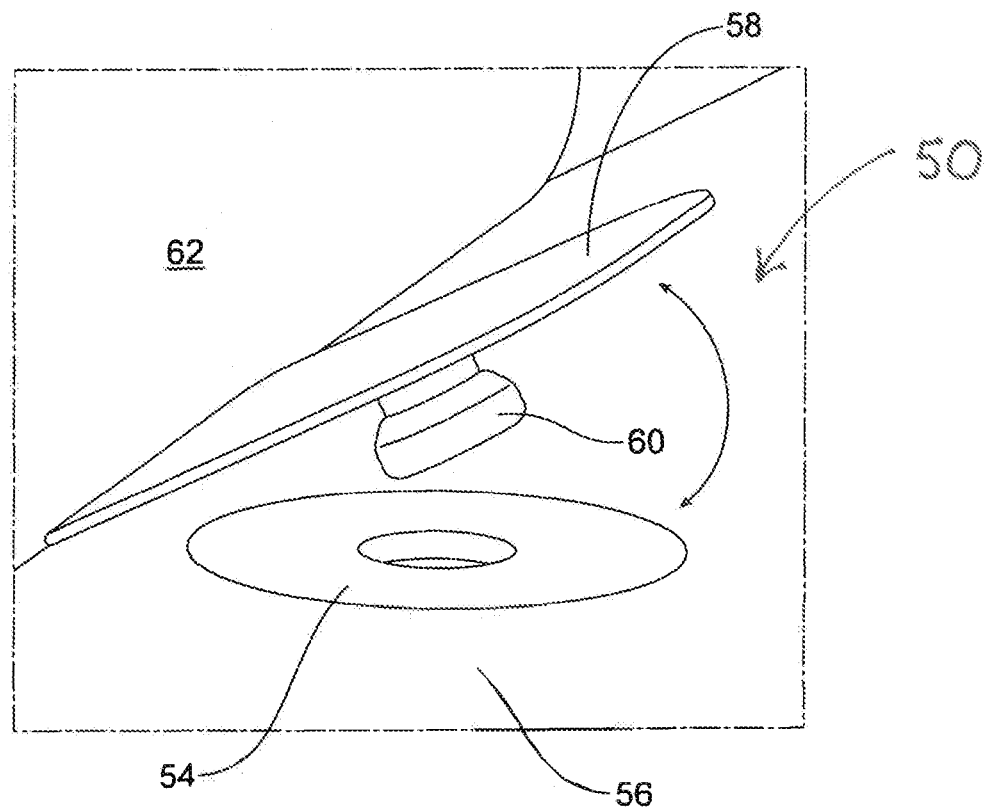
FIG. 5a is a detailed perspective view illustrating the snap lock mechanism used to secure the first end of the storage unit of FIG. 5 in the deployed position.
Figure 5B:
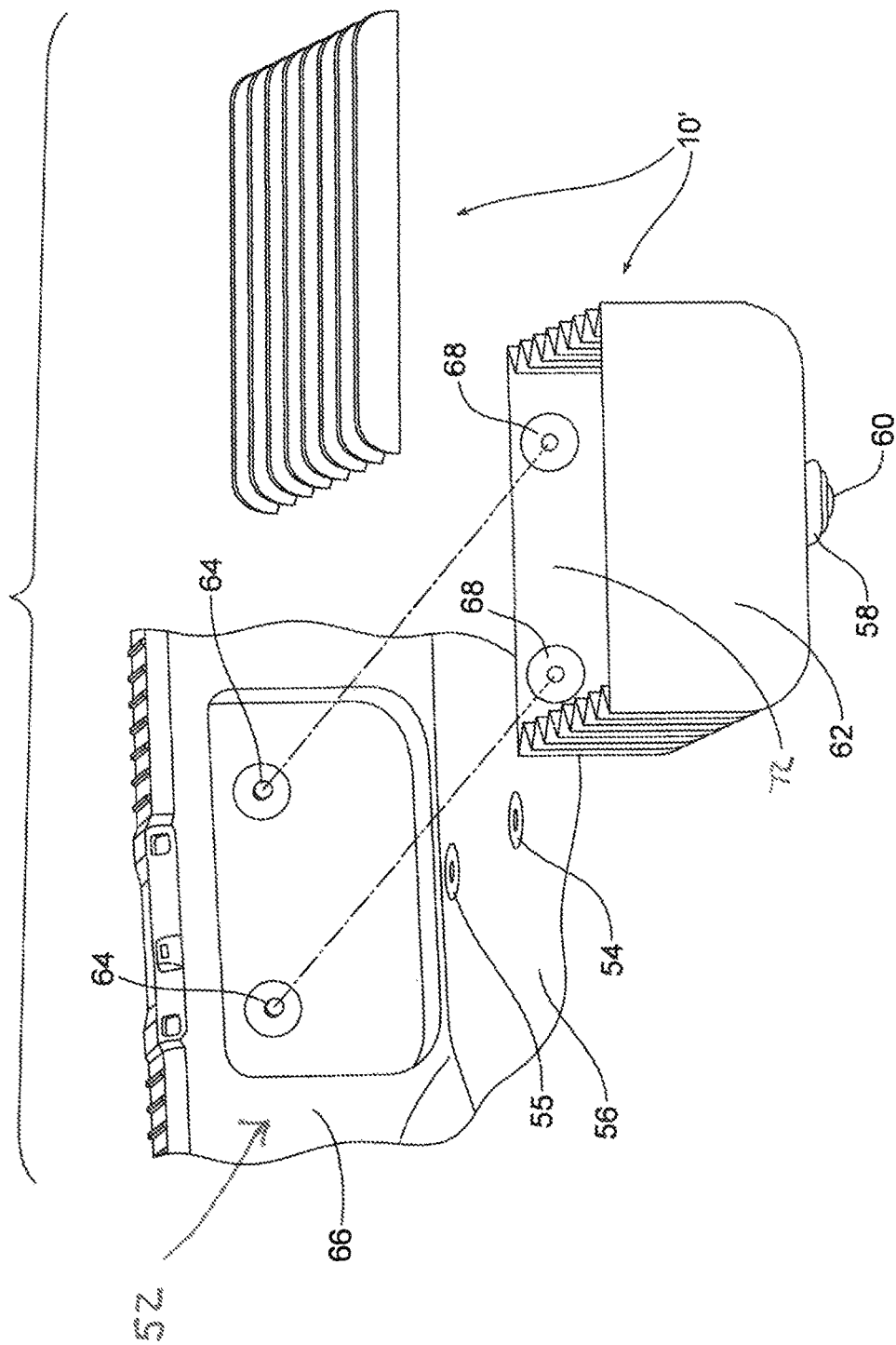
FIG. 5b is a detailed perspective view illustrating the snap lock mechanism used to anchor the second wall of the storage unit to the trunk scuff panel.
Figure 5C:
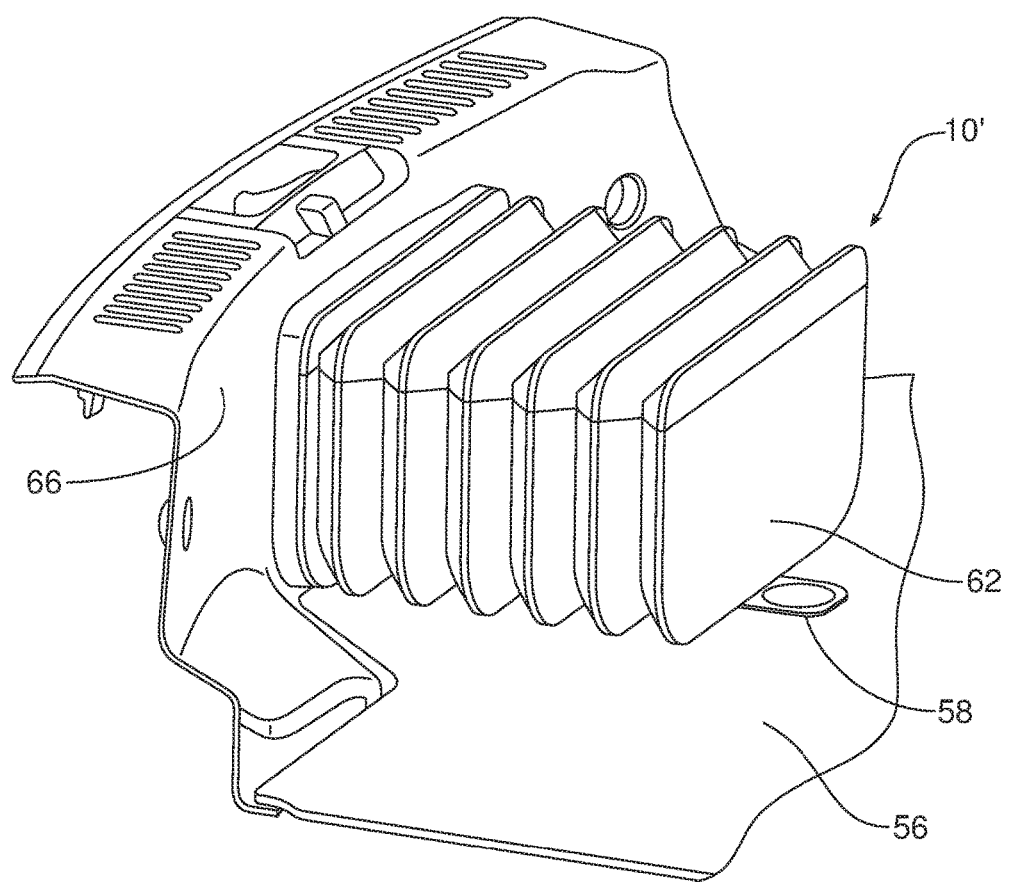
FIG. 5c is a detailed perspective view of the storage unit of FIG. 5 in the deployed position.

An alternative embodiment of a storage unit 10' is illustrated in FIGS. 5-5c. In this embodiment, the storage unit 10' includes two snap lock mechanisms 50, 52. As best illustrated in FIGS. 5a and 5c, the first snap lock mechanism 50 functions to secure the storage unit 10' in the deployed position. That snap lock mechanism 50 includes an anchor grommet 54 provided in the trunk carpet 56 and a tab 58 with a snap fastener 60 that is secured to the first end wall 62 of the storage unit 10'. Thus, when the storage unit 10' is fully deployed, the snap fastener 60 is secured in the anchor grommet 54 to retain the storage unit 10' in the deployed position. When one wants to return the storage unit 10' to the stowed position illustrated in FIG. 5, the snap fastener 60 is popped out of the anchor grommet 54.

The second snap lock mechanism 52 includes two snap fasteners 64 on the trunk scuff panel 66 and two anchor grommets 68 in the second end wall 70 of the storage unit 10'. The snap fasteners 64 are snapped into the anchor grommets 68 in order to secure the storage unit 10' to the trunk scuff panel. This prevents the storage unit 10' from sliding around in the trunk T during vehicle operation. A projecting rim 70 forms a cavity 72 to receive and hold the storage unit 10' when it is in the stowed position.

When it is desired to remove the storage unit 10' from the trunk T, one pops the snap fasteners 64 out of the grommets 68, thereby freeing the storage unit 10' from the trunk scuff panel 66. After cleaning, the storage unit 10' may again be secured in position by snapping the snap fasteners 64 back into the anchor grommets 68.

The storage unit 10 disclosed herein provides a number of benefits and advantages. It is easily accessible and easily used by being integrally incorporated into the motor vehicle 14 through releasable connection with a trim panel such as the trunk scuff panel 32 of the motor vehicle. The storage unit 10 is in the vehicle and available for use when needed by deploying the expandable body 16. At other times, the body 16 may be contracted out of the way so that the entire trunk space may be used for other purposes. Since the storage unit 10 includes an expandable body 16 made from thermal insulating or isolating material, the storage unit is also particularly useful when transporting food and beverage items which need to be maintained at a temperature above or below the ambient temperature.

The foregoing has been presented for purposes of illustration and description. It is not intended to be exhaustive or to limit the embodiments to the precise form disclosed. Obvious modifications and variations are possible in light of the above teachings. For example, a second anchor grommet 55 may be provided in the trunk carpet 56 at a position adjacent the trunk scuff panel 66. Such an anchor grommet 55 is ideally positioned to receive the snap fastener 60 when the storage unit 10' is in the stowed position. Thus, the storage unit 10' may be positively held in the stowed position if desired. All such modifications and variations are within the scope of the appended claims when interpreted in accordance with the breadth to which they are fairly, legally and equitably entitled.

What is claimed:

1. A storage unit for a motor vehicle, comprising:
   an expandable body, wherein said expandable body is made from a thermal insulating material for maintaining a temperature of items stored in said storage unit during transport, wherein said expandable body is displaceable between a stowed position wherein said expandable body is contracted and a deployed position wherein said expandable body is expanded;
   a handle on said expandable body;
   a connector releasably securing said expandable body to a component of said motor vehicle, wherein said connector is carried on a first wall of said expandable body and said handle is carried on a second wall of said expandable body wherein said first wall is opposite said second wall; and
   a lock mechanism to secure said storage unit in said stowed position and said deployed position, wherein said lock mechanism includes a snap fastener carried on said expandable body, a first anchor grommet in a trunk carpet of said motor vehicle at a first position and a second anchor grommet in said trunk carpet at a second position wherein said snap fastener is engaged in said first anchor grommet to secure said expandable body in said stowed position and in said second anchor grommet to secure said expandable body in said deployed position.

2. The storage unit of claim 1, wherein said component is a trim panel.

3. The storage unit of claim 1, wherein said expandable body includes an accordion bottom wall and opposed accordion sidewalls extending between said first wall and said second wall.

4. The storage unit of claim 3, wherein said expandable body further includes a cover that is securable to said first wall, said second wall and said opposed sidewalls.

5. The storage unit of claim 4, wherein said connector is selected from a group of structures consisting of a cooperating hook and loop fastener and a zipper.

6. The storage unit of claim 1, wherein said expandable body is secured and completely held within a cavity in said trim panel when in said stowed position.

* * * * *